United States Patent
Kegelman et al.

(10) Patent No.: US 11,396,292 B2
(45) Date of Patent: Jul. 26, 2022

(54) DEVICES, SYSTEMS, AND METHODS FOR TRANSMITTING VEHICLE DATA

(71) Applicant: Peloton Technology, Inc, Mountain View, CA (US)

(72) Inventors: John Kegelman, Los Altos, CA (US); James Kuszmaul, Mountain View, CA (US); Joshua P. Switkes, Mountain View, CA (US); Trevor Laing, San Jose, CA (US)

(73) Assignee: Peloton Technology, Inc, Mountain View, CA (US)

( * ) Notice: Subject to any disclaimer, the term of this patent is extended or adjusted under 35 U.S.C. 154(b) by 487 days.

(21) Appl. No.: 16/543,176

(22) Filed: Aug. 16, 2019

(65) Prior Publication Data
US 2021/0046932 A1 Feb. 18, 2021

(51) Int. Cl.
*B60W 30/16* (2020.01)
*B60W 50/12* (2012.01)
*G08G 1/00* (2006.01)

(52) U.S. Cl.
CPC ............ *B60W 30/16* (2013.01); *B60W 50/12* (2013.01); *G08G 1/22* (2013.01)

(58) Field of Classification Search
CPC .................................. B60W 30/16; G08G 1/22
See application file for complete search history.

(56) References Cited

U.S. PATENT DOCUMENTS

2021/0331674 A1* 10/2021 Eriksson ............. B60W 30/146

* cited by examiner

*Primary Examiner* — Alan D Hutchinson
*Assistant Examiner* — Andy Schneider
(74) *Attorney, Agent, or Firm* — Redbrick IP, P.C.

(57) ABSTRACT

Systems and methods for platooning vehicles are described. In some aspects, vehicles use sensors to determine a gap between each other. In response to the gap increasing beyond a threshold amount, and a threshold amount of torque being commanded by each of the vehicles, reducing the amount of torque being commanded by the front vehicle. The gap may be determined at least in part by sensors such as a radar, a lidar, and/or a camera. These sensors may be mounted on either a rear vehicle in the platoon, or a front vehicle in the platoon.

20 Claims, 11 Drawing Sheets

DEVICES, SYSTEMS, AND METHODS FOR TRANSMITTING VEHICLE DATA

BACKGROUND

Enabling a vehicle to follow closely behind one vehicle safely through partial or full automation has significant fuel savings, safety, and/or labor savings benefits, but is generally unsafe when a driver tries to do this manually. Presently, during normal driving, vehicle motion is controlled either manually, by a driver, or by convenience systems, such as cruise control or adaptive cruise control. The various types of cruise control systems control vehicle speed to make driving more pleasurable or relaxing, by partially automating the driving task. Some of these systems use range sensors and/or vehicle sensors to control the speed to maintain a constant headway relative to the leading vehicle (also referred to herein as a front vehicle). In general, these cruise control systems provide minimal added safety, and do not have full control of the vehicle (in terms of being able to fully brake or accelerate).

Driver control does not match the safety performance of even current systems, for several reasons. First, a driver cannot safely maintain a close following distance. In fact, the relatively short distances between vehicles necessary to get any measurable fuel savings results in an unsafe condition if the vehicle is under driver control, thereby risking a costly and destructive accident. Further, the driver is not as capable of maintaining an optimal headway as an automated system is. In fact, a driver trying to maintain a constant headway often causes rapid and large changes in command (accelerator pedal position for example), resulting in a loss of efficiency.

Thus, it would be desirable to have reliable and economical at least semi-automated vehicular convoying/platooning systems which enable vehicles to follow closely together in safe, efficient, and convenient manner. While this is desired, various obstacles may cause such a system to be difficult to implement, as will be described herein.

BRIEF DESCRIPTION OF THE DRAWINGS

In order to describe the various aspects of the present disclosure, some detailed description now will be provided, by way of illustration, with reference to the accompanying drawings, in which.

DETAILED DESCRIPTION

Figure 1:
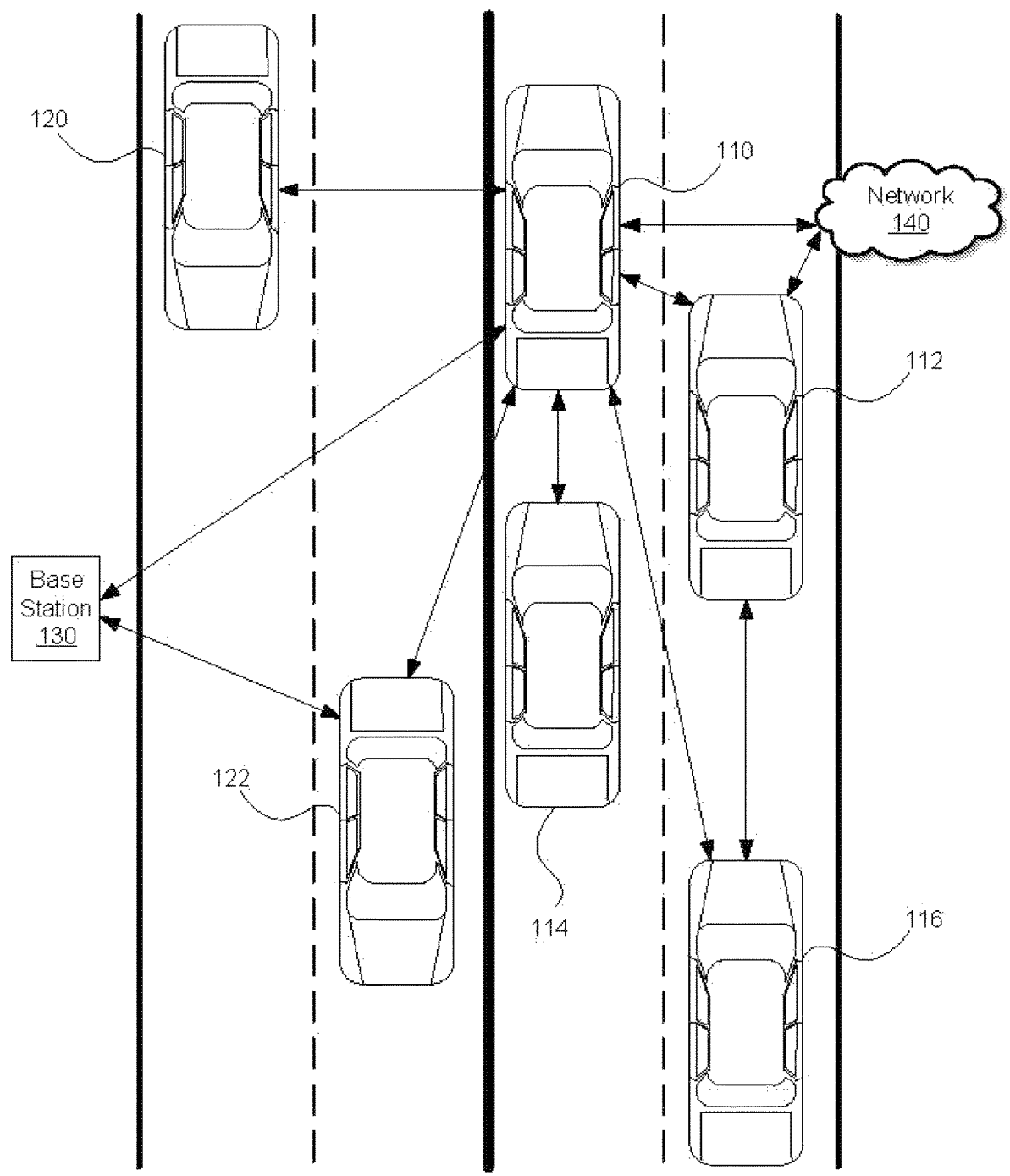
FIG. 1 illustrates a diagram of vehicles transmitting data, in accordance with some embodiments.

The present invention will now be described in detail with reference to several embodiments thereof as illustrated in the accompanying drawings. In the following description, numerous specific details are set forth in order to provide a thorough understanding of embodiments of the present invention, including the description of a plurality of different aspects of the invention, including, in some cases, one or more alternatives. It will be apparent to those skilled in the art that the invention can be practiced without implementing all of the features disclosed herein.

The Applicant has proposed various vehicle communication systems in which a second, and potentially additional, vehicle(s) is/are automatically, or semi-automatically, controlled in response to receiving instructions from a first vehicle. By way of example, U.S. patent application Ser. Nos. 15/605,456, 15/607,902; 13/542,622 and 13/542,627; U.S. Provisional Patent Application Nos. 62/377,970 and 62/343,819; and PCT Application Nos. PCT/US2014/030770, PCT/US2016/049143 and PCT/US2016/060167 describe various vehicle systems in which a recipient vehicle is at least partially controlled by a provider vehicle (e.g., a recipient vehicle is a vehicle that receives data from a provider vehicle, but it should be understood that a recipient vehicle can send data to a provider vehicle). Some of these applications describe platooning, wherein at least one vehicle follows closely behind another. In such cases, a recipient vehicle may be referred to as a trailing vehicle and/or a rear vehicle, and a provider vehicle may be referred to as a lead vehicle and/or a front vehicle. Each of these earlier applications is incorporated herein by reference in their entirety.

One of the goals of platooning is typically to maintain a desired position between the platooning vehicles and/or a desired relative speed and/or time headway (e.g., a gap may refer to a distance, a headway, or both). Thus, it should be appreciated that, herein, any reference to the term "gap" could refer to a distance, a headway, or both. Further, while the term "maintain" is used throughout this disclosure, maintaining may mean staying within a gap (distance/headway), staying at a gap, and/or keeping at least a certain gap. Further, a desired gap may include a relative distance, time headway, and/or angle/offset. A longitudinal distance and/or time headway is frequently referred to herein as a "target gap". That is, it is desirable for the trailing vehicle (e.g., a rear vehicle) to maintain a designated gap relative to a specific vehicle (e.g., a lead vehicle). The vehicles involved in a platoon will typically have sophisticated control systems suitable for initiating a platoon, maintaining the gap under a wide variety of different driving conditions, and gracefully dissolving (e.g., ending) the platoon as appropriate.

For the purposes of this application, the subtle yet important difference between controlling and commanding should be understood. Herein, the term commanding may be used to signify an action where a device is ordered to do something, while controlling refers to device supervision and/or adjustment. For example, an engine may be commanded to provide 2,000 N·m as opposed to controlling, where an engine ensures 2,000 N·m is being provided while potentially taking other variables into account and adjusting as needed such that the engine is substantially (e.g., for the most part/about/close to) providing a particular amount of torque, which in this case would be substantially 2,000 N·m. Herein, if a system can command and/or control, either term may be used for the ease of reading.

In some embodiments described herein, a vehicle may essentially control some or all of the functions of another vehicle using V2V communications. Research in the field of V2V communications has increased in recent years. In some embodiments herein, a recipient vehicle controlled by a provider vehicle will receive data from the provider vehicle including drive-by-wire commands. For example, a provider vehicle may send data wirelessly to a recipient vehicle, wherein the sent data causes the recipient vehicle to apply a certain amount of throttle. As another example, a provider vehicle may send data to more than one vehicle (e.g., broadcast data), and such data may control vehicles. For example, one vehicle may provide data to more than one other vehicle causing the receiving vehicles to apply their brakes.

Herein, the term torque is used broadly to mean any portion of a system that may affect the torque of a vehicle, unless explicitly stated otherwise. For instance, the term torque may be used to describe, at least: (1) engine gross torque, (2) engine net torque, (3) wheel torque from an engine, and (4) wheel torque from braking. Further, each of these may include gear/transmission/shifting information, and various types of torque may be combined (e.g., wheel torque from an engine and wheel torque from braking may be combined and referred to as wheel torque).

At a high level, torque is a rotational force. An engine's gross torque, as an example, is the twisting force that an engine can produce before parasitic losses from the drivetrain (although, in some embodiments, an engine's gross torque may be an amount of force applied by pistons to a drive shaft). An engine's net torque, for example, may be the definition used by SAE standards J1349 and J2723, and may be the torque from an engine, measured at the same location as the gross torque (e.g., after the flywheel), when the engine is equipped with some or all of the parts necessary for actual engine operation (e.g., when an engine is actually installed in a vehicle). An engine's torque is transmitted through a gearbox, where it is multiplied with a gear ratio of an engaged gear, and produces a gearbox torque. It should be understood that commanding/controlling torque, as described herein, can apply to electric vehicles, including electric vehicles that may employ multispeed gearing (e.g., a transmission capable of shifting gear ratios). Next, torque can be measured at a differential, which then sends torque in multiple directions to the wheels. In some embodiments various amounts of torque are actively directed to one or more wheels (e.g., commanding/controlling torque using a differential such as a limited-slip differential). The amount of torque directed to any particular wheel/set of wheels may be determined based on attributes of a vehicle such as weight, the balance of a load, brake attributes, etc. Rotational force on a wheel may be referred to as wheel torque (e.g., when torque from an engine, retarder, or foundation brake reaches a vehicle's wheel). Wheel torque from an engine typically forces a vehicle to move forward (or backward if in reverse), or accelerate or decelerate if already in motion. However, wheel torque from a brake (e.g., a foundation brake) dampens wheel torque from an engine, and thus provides torque in an opposite direction from the engine torque. Since torque is a sum of all the individual torques acting on an object (e.g., net torque), wheel torque may be a combination of engine torque, brake torque, and/or any other torques applied.

Thus, herein, the term torque can be used to describe, at least: (1) the gross torque of an engine (e.g., the torque an engine can produce before loss from the drivetrain), (2) the net torque of an engine (e.g., the torque of an engine as it would be when installed in a vehicle including stock ignition timing, fuel delivery, exhaust systems, and accessories), (3) wheel torque (e.g., from an engine, from braking, a combination of the two), and (4) any of the torques described above with or without gear/shifting information (e.g., torque multiplied by a gear ratio or an amount of change of torque when a gear ratio changes).

In some embodiments, commanding/controlling torque may assist with platooning. When platooning, one goal is to maintain a desired position between vehicles. This position may be based on time and/or distance (e.g., time headway, distance headway). Dissolving a platoon may comprise commanding/controlling torque, ending a platoon, and/or causing a gap between vehicles to increase such that they are traveling at a safe distance.

In some embodiments, a gap is maintained by using vehicle-to-vehicle (V2V) communications to transmit information from a lead vehicle to a rear vehicle. This information may include radar information indicating the current gap between two vehicles, along with information indicating the speed of the lead vehicle. With this information, along with a target gap, a rear vehicle can apply throttle or brakes such that the current gap is equal to the target gap.

As would be understood by one of skill in the art, maintaining a gap between two vehicles can be difficult, especially when the vehicles are traveling long distances over different types of terrain. In some instances, two platooning vehicles may be maintaining a desired gap while commanding 100% of the available torque. In such an instance if a front vehicle were to pull away from a rear vehicle (e.g., increase the gap), to return the gap to its desired state, either: (1) the rear vehicle would need to change gears, or (2) the front vehicle would need to slow down. In various embodiments, pulling away may be detected by an increase in the gap, and/or a determination that a relative velocity between two vehicles has changed beyond a threshold amount. In some embodiments, the vehicles may not be communicating and a front vehicle's torque may be limited (as described elsewhere herein). In such an embodiment, for example, a front vehicle may detect the distance of a rear vehicle using a camera.

In some embodiments described herein, a front vehicle in a platoon's torque may be reduced and/or limited such that a gap between the platooning vehicles that has increased is returned to its desired state. In one or more embodiments, a front vehicle's torque may be reduced and/or limited in response to an increase in a gap above a threshold amount, when at least two vehicles in a platoon are commanding 100% of their available torque. In other words, in some embodiments, reducing the torque produced at by a front vehicle's power plant may only occur when both the front vehicle and a rear vehicle are producing a maximum available amount of torque.

As an example, which will be described again below with reference to FIGS. 4-9, situations where a gap grows when two vehicles are platooning and commanding a maximum amount of torque may occur when a grade increases (e.g., when two vehicles reach a hill). In some cases, a front vehicle may be commanding a maximum amount of torque and reduce speed when it begins to travel uphill. In response to the front vehicle reducing speed, a rear vehicle may also reduce its speed (e.g., before it reaches the hill). When the rear vehicle then reaches the hill, it may not be traveling as fast as the front vehicle was when it began traveling uphill, and as a result its momentum may be less and its speed may be reduced even more than the front vehicle's speed was reduced when it reached the hill. As a result of the rear vehicle's speed being reduced more than the front vehicle's speed was reduced, the gap between the vehicles may grow. As described herein, to return the gap to its desired amount, the front vehicle may slow down (e.g., by reducing and/or limiting the amount of torque its power plant produces).

In some embodiments, it is envisioned that one or more vehicles may be prohibited from shifting during the example embodiments described herein. For instance, in response to a desired gap growing above a threshold—while both vehicles are commanding 100% of their torque—a front, back, or both vehicles may be prevented from changing gear ratios (e.g., a driver may be prevented from changing gears).

In some embodiments, a determination that a front vehicle's torque will be limited/reduced may be made at a rear vehicle, the front vehicle, or both (e.g., it may be made at least at a platooning ECU, an engine ECU, a transmission ECU, etc.). In some embodiments, a determination may be made based on information transmitted to a platooning ECU (on a front vehicle and/or rear vehicle) from an engine ECU (on a front and/or rear vehicle) and/or transmission ECU (on a front and/or rear vehicle).

In some embodiments, a determination that a gap is growing may be made at a front vehicle, a rear vehicle, or both. For example, components on a rear vehicle such as a forward-looking radar (FLR) may be used to determine that a gap has grown beyond a threshold distance. In another example, components on a front vehicle such as a rear facing camera may be used to determine that a gap has grown beyond a threshold distance.

In some embodiments, a grade may increase while gap is growing and/or while a gap is returning to its desired amount. In such a case, an amount of torque produced by the front vehicle may shrink. Such an example may occur when a grade of a hill increases while a gap is decreasing to return to its desired amount. There, despite the reduction in torque produced by the front vehicle, the rear vehicle still may not reduce the gap to its desired amount, and as such the front vehicle's torque production may be limited/reduced further than the original amount of limiting/reducing to allow the gap to return to its desired amount.

In some embodiments, as a gap returns to its desired amount, the rate at which the gap shrinks may taper. For example, as a rear vehicle gets closer to a front vehicle, the rear vehicle may slow (or the front vehicle may speed up) such that the desired gap is achieved smoothly. In other words, rather than having a gap shrink at a constant speed—which could undesirably result in a gap shrinking too much—a gap may shrink at a first speed and as it approaches the desired amount it may shrink at a second, slower speed.

In one or more embodiments, systems and methods described herein limit torque produced by a front vehicle to perform a draw-in (e.g., reduce a gap and/or begin platooning) at a desired speed. Such an embodiment may occur in response to a request for a draw-in wherein a rear vehicle cannot (e.g., due to a vehicle system limitation), or should not (e.g., due to a speed limit), increase its velocity. In some embodiments, a gap may be greater than a desired amount, and a following vehicle a system requests a draw-in (e.g., either because a following vehicle is entering a platoon or is already in a platoon and needs to reduce a gap). It should be understood that in some embodiments, this may apply to any situation wherein one vehicle is controlling and/or commanding the torque, brakes, and/or steering of another vehicle. In some embodiments, to allow a rear vehicle to draw-in, the torque in the front vehicle may be reduced and/or limited (as described throughout this application). For example, two vehicles in a platoon may be traveling at a speed limit (and/or may be commanding all available torque) and the front vehicle may need to reduce its torque such that a gap amount decreases (e.g., a rear vehicle draws-in). In some embodiments, once a desired gap amount is achieved (or is close to being achieved), the torque limiting/commands to reduce may be removed/ended. In some embodiments, after a desired gap is achieved or substantially achieved (e.g., +/−5% of the desired gap), systems and methods herein may cause the front vehicle to return to its speed before its torque was limited/reduced.

In some embodiments, systems and methods described herein may be helpful for assisting multiple vehicles with the space in between them. For example, systems and methods described herein may assist with traffic by causing vehicles to be spaced at a particular distance from each other. In one or more embodiments, at least semi-autonomous vehicles may desire to have a certain gap between them and one or more vehicles in front, behind, and/or to the sides of them. In such cases, vehicles may communicate with each other, infrastructure, and/or with a wireless network to determine their location, the location of other vehicles, and/or distances between themselves and other vehicles. Further, in some embodiments, one or more of the vehicles may be driven manually, and at least one or more portions of the embodiments described herein may apply to one or more of the vehicles (e.g., if a rear vehicle slows down a front vehicle may have its torque reduced, even if the rear vehicle is being driven manually).

In various embodiments described herein, a front vehicle (including its torque at any stage described herein) may be controlled/commanded at least in part by: a driver, remotely (e.g., via a satellite, wireless network, another vehicle), using cruise control, and/or using adaptive cruise control.

FIG. 1 illustrates a diagram of vehicles transmitting data, in accordance with some embodiments. FIG. 1. depicts multiple vehicles 110, 112, 114, 116, 120, and 122. FIG. 1 also depicts a base station 130 and a network 140. In various embodiments, vehicle 110 may transmit data (also referred to as information) to other vehicles 112, 114, 116, 120, and 122 directly, via base station 130, and/or via network 140. Vehicle 110 may also receive data from other vehicles 112, 114, 116, 120, and 122 directly, via base station 130, and/or via network 140. In some embodiments, a vehicle (e.g., vehicle 112) may retransmit information received from a first vehicle (e.g., vehicle 110) to another vehicle (e.g., vehicle 116) with or without additional information (e.g., information generated at vehicle 112 in addition to information received from vehicle 110).

Figure 2:
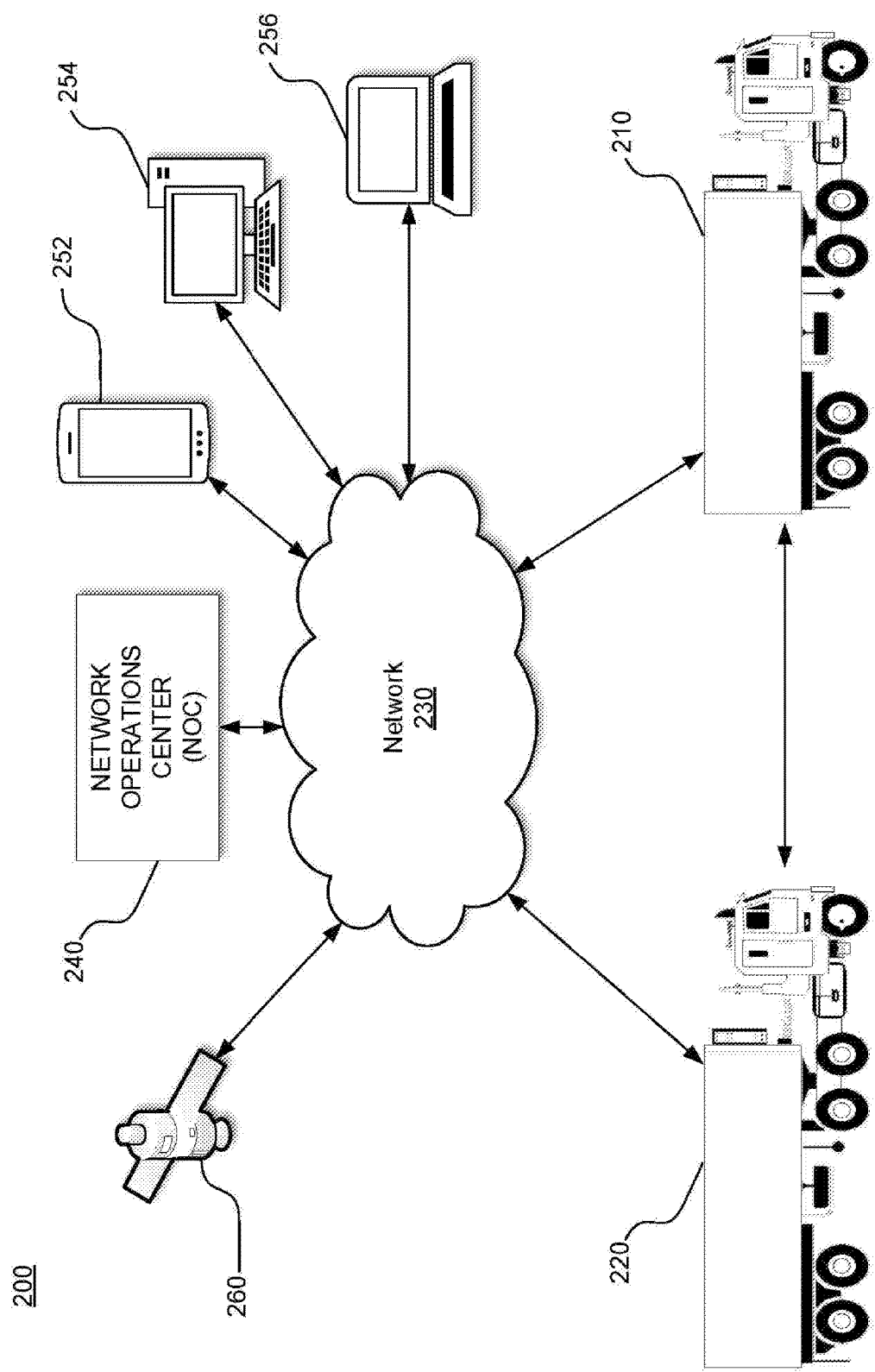
FIG. 2 illustrates a diagram of a platooning system, in accordance with some embodiments.

FIG. 2 illustrates an example system 200 including two vehicles capable of platooning and associated communication links. Vehicles 210 and 220 are depicted by trucks which are capable of platooning, and can communicate with each other directly or through network 230. Direct communication between two vehicles can occur wirelessly via Dedicated Short Range Communications (DSRC) (e.g., the IEEE 802.11p protocol), which is a two-way short to medium range wireless communications technology that has been developed for vehicle-to-vehicle (V2V) communications. Of course, other communications protocols and channels may be used in addition to or in place of a DSRC link. For example, the inter-vehicle communications may additionally or alternatively be transmitted over a cellular communications channel such as 4G LTE Direct, 5G, a Citizen's Band (CB) Radio channel, one or more General Mobile Radio Service (GMRS) bands, one or more Family Radio Service (FRS) bands, Wi-Fi, Zigbee and/or any other now existing or later developed communications channels using any suitable communication protocols either alone or in combination.

FIG. 2 also includes a network operations center (NOC) 240. NOC 240 may include one or more locations from which network monitoring, control, and/or management may be exercised over a communication network (e.g., the cloud/a multi-tenant environment). NOC 240 can oversee a complex network of vehicles, satellite communications, web applications, and/or management tools. Users of NOC 240 may be responsible for monitoring one or more networks, sub-networks, fleets of vehicles, and/or sub-fleets of vehicles that may require special attention to avoid degraded service. For example, NOC 240 may receive information about various vehicles 210 and 220 such as their locations and attributes, run various programs based on the received information, and send information back to vehicles 210 and 220, including indicating whether they are allowed to platoon.

In addition to NOC 240, client devices 252 (e.g., a smartphone or tablet), 254 (e.g., a desktop computer or terminal), and 256 (e.g., a laptop computer or terminal) may be used to send and/or receive information about vehicles 210 and 220, NOC 240, or information from canonical sources such as the Internet (e.g., Google Maps or another online map provider, a traffic provider, a weather provider, etc.). Client devices can be used to view attributes of vehicles 210 and 220 such as their location, an estimate of their weight, their speed, an amount of engine torque, amount of applied brake, a destination, etc.

FIG. 2 also includes a satellite 260, which can send signals to network 230, NOC 240, and/or vehicles 210 and 220. Satellite 260 may be part of a satellite navigation system such as a global navigation satellite system (GNSS). GNSSs include the United States' Global Positioning System (GPS), Russia's GLONASS, China's BeiDou Navigation Satellite System, and the European Union's Galileo. Based on information sent from satellite 260, systems described herein can determine locations of vehicles 210 and 220.

Of course, it should be appreciated that the system described in FIG. 2 is only an example, and that many other configurations may exist. For example, a NOC may assist with the monitoring and control of hundreds or thousands of vehicles, and many types of web applications may exist.

Figure 3:
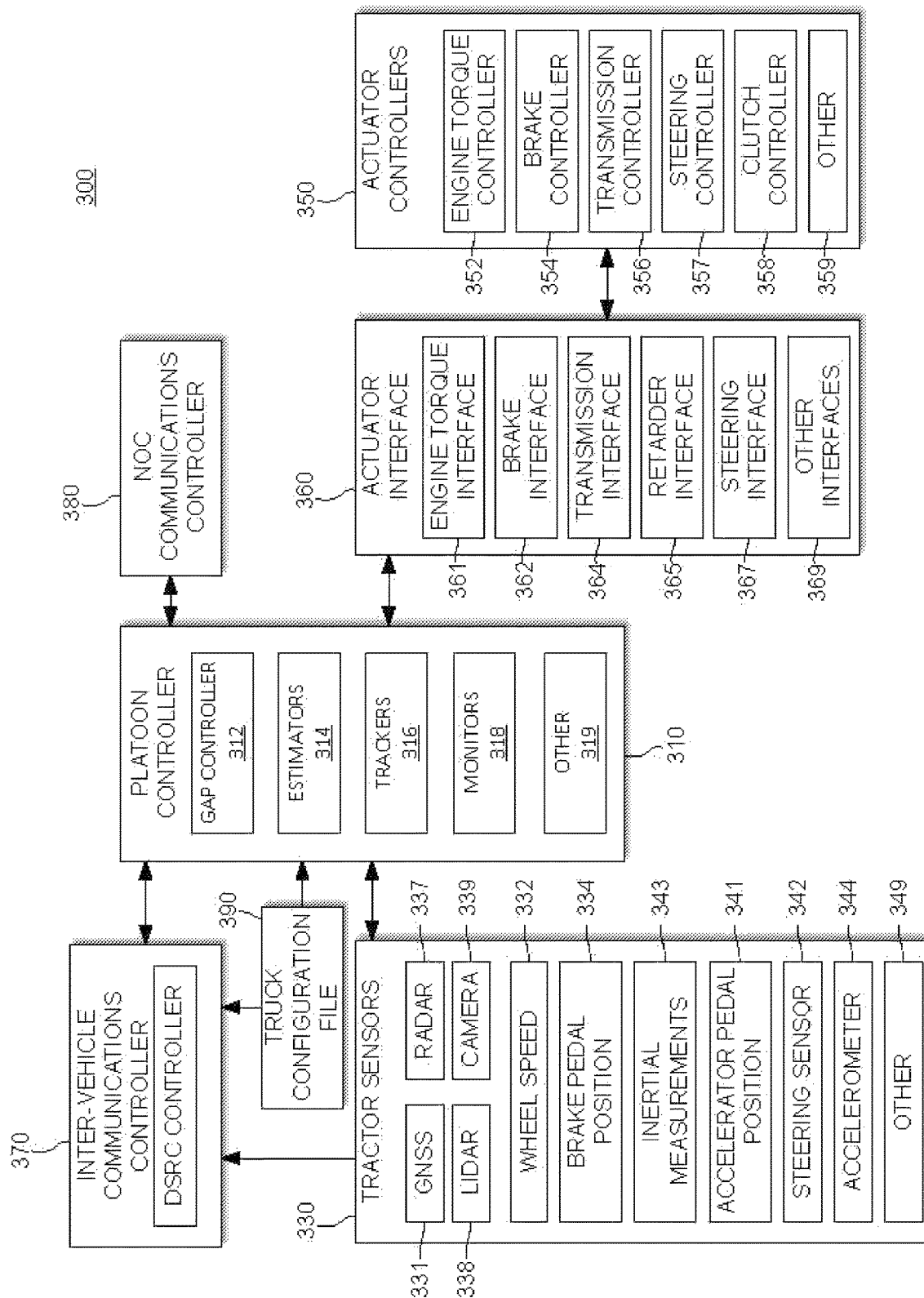
FIG. 3 illustrates a block diagram of a platooning system, in accordance with some embodiments.

FIG. 3 illustrates and example system 300 including a platoon controller 310 (also referred to as a platoon electronic control unit, a platoon ECU, or a PECU). As described throughout this disclosure, a wide variety of configurations may be used to implement platooning systems described herein. The specific controller design can vary based on the level of automation contemplated for the controller, as well as the nature of and equipment available on the host vehicles participating in the platoon. FIG. 3 illustrates components of one possible configuration.

FIG. 3 diagrammatically illustrates a vehicle control architecture that can be suitable for use with platooning tractor-trailer trucks. The specific controller, or platooning ECU, illustrated is primarily designed for use in conjunction with a platooning system in which both vehicles include an active driver. The driver of the lead vehicle being fully responsible for control of the lead vehicle. In some embodiments the driver of the rear vehicle may be responsible for steering the rear vehicle, but the platoon controller 310 is primarily responsible for controlling the rear vehicle's torque and braking requests during active platooning. However, as discussed herein, it should be appreciated that generally similar control schemes can be used in systems which contemplate more automated control of one or both of the platoon partners or which utilize vehicle control commands other than or in addition to torque and braking requests.

In the example embodiment illustrated in system 300, a platoon controller 310, receives inputs from a number of sensors 330 on the tractor and/or one or more trailers or other connected units, and a number of actuator controllers 350 (also referred to as electronic control units or ECUs) arranged to control operation of the tractor's powertrain and other vehicle systems. An actuator interface 360 may be provided to facilitate communications between the platoon controller 310 and the actuator controllers 350. In some embodiments, one or more of the actuator interfaces 360 may be included in one or more of the actuator controllers 350 (e.g., an actuator interface may be included in an ECU). Platoon controller 310 also interacts with an inter-vehicle communications controller 370 (also referred to as an inter-vehicle communications ECU) which orchestrates communications with the platoon partner and a NOC communications controller 380 (also referred to as a NOC communication ECU) that orchestrates communications with a NOC. The vehicle also may have selected configuration files 390 that include known information about the vehicle.

Some of the functional components of the platoon controller 310 include gap controller 312, a variety of estimators 314, one or more partner vehicle trackers 316 and various monitors 318. In many applications, the platoon controller 310 will include a variety of other components 319 as well.

Some of the sensors utilized by platoon controller 310 may include GNSS unit 331, wheel speed sensors 332, inertial measurement devices 334, radar unit 337, lidar unit 338, cameras 339, accelerator pedal position sensor 341, steering wheel position sensor 342, brake pedal position sensor 343, and various accelerometers 344. Of course, not all of these sensors will be available on all vehicles involved in a platoon and not all of these sensors are required in any particular embodiment. A variety of other sensors 349 (now existing or later developed or commercially deployed) may be additionally or alternatively be utilized by platoon controller 310 in other embodiments.

Many (but not all) of the described sensors, including wheel speed sensors 332, radar unit 337, accelerator pedal position sensor 341, steering wheel position sensor 342, brake pedal position sensor 343, and accelerometer 344 are relatively standard equipment on newer trucks (tractors) used to pull semi-trailers. However, others, such as GNSS unit 331 and lidar unit 338 (if used) are not currently standard equipment on such tractors or may not be present on a particular vehicle and may be installed as needed or desired to help support platooning.

FIG. 3 also illustrates various actuator controllers 350. It should be understood that, in various embodiments, some or all types of controllers may be referred to interchangeably as electronic control units (ECUs). It should, however, be understood that some ECUs may control actuators, some ECUs may control communications, some ECUs may monitor sensors, and some may perform any combination thereof. Thus, it should be appreciated that the system shown in FIG. 3 is merely one of a wide variety of systems that may be used to control platooning.

Some of the vehicle actuator controllers 350 that platoon controller 310 may direct at least in part include engine torque controller 352; brake controller 354; transmission controller 356; steering/automated steering controller 357; and clutch controller 358. Of course, not all of these actuator controllers will be available or are required in any particular embodiment and it may be desirable to interface with a variety of other vehicle actuator controllers 359 that may be available on the vehicle as well. Therefore, it should be appreciated that the specific actuator controllers 350 directed or otherwise utilized by the platoon controller on any particular controlled vehicle may vary widely. Further, the capabilities of any particular actuator controller (e.g. engine torque controller 352), as well as its interface (e.g., the nature and format of the commands, instructions, requests and messages it can handle or generate) will often vary with the make and model of that particular actuator controller. Therefore, an actuator interface 360 is preferably provided to translate requests, commands, messages and instructions from the platoon controller 310 into formats that are appropriate for the specific actuator controller hardware and software utilized on the controlled vehicle. The actuator interface 360 also provides a mechanism for communicating/translating messages, commands, instructions and requests received from the various actuator controllers back to the platoon controller 310. In some embodiments, an appropriate actuator interface may be provided to interact with each of the specific vehicle controllers utilized. In various embodiments, this may include one or more of: an engine torque interface 361; a brake interface 362; a transmission interface 364; a retarder interface 365; a steering interface 367; and/or any other appropriate controller interface 369. In some embodiments, various controllers may be combined (e.g., in the case of a chasses controller, or an engine ECU that also controls a retarder—which may obviate the need for a retarder ECU).

Large trucks and other heavy vehicles (e.g., class 8 vehicles) frequently have multiple systems for "braking" the truck. These include the traditional brake system assemblies mounted in the wheels of the vehicle—which are often referred to in the industry as the "foundation brakes." Most large trucks/heavy vehicles also have a mechanism referred to as a "retarder" that is used to augment the foundation brakes and serve as an alternative mechanism for slowing the vehicle or to help prevent the vehicle from accelerating down a hill. Often, the retarder may be controlled by the engine torque controller 352 and in such embodiments, the retarder can be controlled by sending appropriate torque commands (which may be negative) to engine torque controller 352. In other embodiments a separate retarder controller (not shown) may be accessible to, and therefore directed by, platoon controller 310 through an appropriate retarder interface 365. In still other embodiments, the platoon controller 310 may separately determine a retarder command that it sends to the actuator interface 360. In such embodiments the actuator interface will interpret the retard command and pass on appropriate retardation control commands to an Engine ECU or other appropriate vehicle controller.

The communications between vehicles may be directed over any suitable channel and may be coordinated by inter-vehicle communications controller 370. As described above, the DSRC protocol may work well.

The specific information transmitted back and forth between the vehicles may vary widely based on the needs of the controllers. In various embodiments, the transmitted information may include the current commands generated by the platoon controller 310 such as requested/commanded engine torque, and/or requested/commanded braking deceleration 382. They may also include steering commands, gear commands, etc. when those aspects are controlled by platoon controller 310. Corresponding information is received from the partner vehicle, regardless of whether those commands are generated by a platoon controller or other suitable controller on the partner vehicle (e.g., an adaptive cruise control system (ACC) or a collision mitigation system (CMS)), or through other or more traditional mechanisms— as for example, in response to driver inputs (e.g., accelerator pedal position, brake position, steering wheel position, etc.).

In many embodiments, much or all of the tractor sensor information provided to platoon controller 310 is also transmitted to the platoon partner and corresponding information is received from the platoon partner so the platoon controllers 310 on each vehicle can develop an accurate model of what the partner vehicle is doing. The same is true for any other relevant information that is provided to platoon controller 310, including any vehicle configuration information 390 that is relevant to platoon controller 310. It should be appreciated that the specific information transmitted may vary widely based on the requirements of platoon controllers 310, the sensors and actuators available on the respective vehicles, and the specific knowledge that each vehicle may have about itself.

The information transmitted between vehicles may also include information/data about intended future actions as will be discussed in greater detail below. For example, if the lead vehicle knows it is approaching a hill, it may expect to increase its torque request (or decrease its torque request in the context of a downhill) in the near future and that information can be conveyed to a rear vehicle for use as appropriate by the platoon controller 310. Of course, there is a wide variety of other information that can be used to foresee future torque or braking requests and that information can be conveyed in a variety of different forms. In some embodiments, the nature of the expected events themselves can be indicated (e.g., a hill, curve, or exit is approaching) together with the expected timing of such events. In other embodiments, the intended future actions can be reported in the context of expected control commands such as the expected torques and/or other control parameters and the timing at which such changes are expected. Of course, there are a wide variety of different types of expected events that may be relevant to the platoon control.

The communications between the vehicles and the NOC may be transmitted over a variety of different networks, such as a cellular network, various Wi-Fi networks, satellite communications networks and/or any of a variety of other networks as appropriate. The communications with the NOC may be coordinated by NOC communications controller 380. The information transmitted to and/or received from the NOC may vary widely based on the overall system design. In some circumstances, the NOC may provide specific control parameters such as a target gap. These control parameters or constraints may be based on factors known at the NOC such as speed limits, the nature of the road/terrain (e.g., hilly vs. flat, winding vs. straight, etc.) weather conditions, traffic or road conditions, etc. In other circumstances the NOC may provide information such information to platoon controller 310. The NOC may also provide information about the partner vehicle including its configuration information and any known relevant information about its current operational state such as weight, trailer length, etc.

Lastly, with regard to FIG. 3, configuration file 390 may include a wide variety of information about the host vehicle that may be considered relevant to controller 310. By way of example, some of the information might include the vehicle's specification including such things as engine performance characteristics, available sensors, the existence and/or type of platooning indicators (e.g., lights that indicate a vehicle is platooning), the nature of its braking system, the location of its GNSS antenna relative to the front of the cab, gear ratios, differential ratios etc.

FIG. 3 illustrates and example system 300 including a platoon controller 310 (also referred to as a platoon electronic control unit, a platoon ECU, or a PECU). As described throughout this disclosure, a wide variety of configurations may be used to implement platooning systems described herein. The specific controller design can vary based on the level of automation contemplated for the controller, as well as the nature of and equipment available on the host vehicles participating in the platoon. FIG. 3 illustrates components of one possible configuration.

FIG. 3 diagrammatically illustrates a vehicle control architecture that can be suitable for use with platooning tractor-trailer trucks. The specific controller, or platooning ECU, illustrated is primarily designed for use in conjunction with a platooning system in which both vehicles include an active driver. The driver of the lead vehicle being fully responsible for control of the lead vehicle. In some embodiments the driver of the rear vehicle may be responsible for steering the rear vehicle, but the platoon controller 310 is primarily responsible for controlling the rear vehicle's torque and braking requests during active platooning. However, as discussed herein, it should be appreciated that generally similar control schemes can be used in systems which contemplate more automated control of one or both of the platoon partners or which utilize vehicle control commands other than or in addition to torque and braking requests.

In the example embodiment illustrated in system 300, a platoon controller 310, receives inputs from a number of sensors 330 on the tractor and/or one or more trailers or other connected units, and a number of actuator controllers 350 (also referred to as electronic control units or ECUs) arranged to control operation of the tractor's powertrain and other vehicle systems. An actuator interface 360 may be provided to facilitate communications between the platoon controller 310 and the actuator controllers 350. In some embodiments, one or more of the actuator interfaces 360 may be included in one or more of the actuator controllers 350 (e.g., an actuator interface may be included in an ECU). Platoon controller 310 also interacts with an inter-vehicle communications controller 370 (also referred to as an inter-vehicle communications ECU) which orchestrates communications with the platoon partner and a NOC communications controller 380 (also referred to as a NOC communication ECU) that orchestrates communications with a NOC. The vehicle also may have selected configuration files 390 that include known information about the vehicle.

Some of the functional components of the platoon controller 310 include gap controller 312, a variety of estimators 314, one or more partner vehicle trackers 316 and various monitors 318. In many applications, the platoon controller 310 will include a variety of other components 319 as well.

Some of the sensors utilized by platoon controller 310 may include GNSS unit 331, wheel speed sensors 332, inertial measurement devices 334, radar unit 337, lidar unit 338, cameras 339, accelerator pedal position sensor 341, steering wheel position sensor 342, brake pedal position sensor 343, and various accelerometers 344. Of course, not all of these sensors will be available on all vehicles involved in a platoon and not all of these sensors are required in any particular embodiment. A variety of other sensors 349 (now existing or later developed or commercially deployed) may be additionally or alternatively be utilized by platoon controller 310 in other embodiments.

Many (but not all) of the described sensors, including wheel speed sensors 332, radar unit 337, accelerator pedal position sensor 341, steering wheel position sensor 342, brake pedal position sensor 343, and accelerometer 344 are relatively standard equipment on newer trucks (tractors) used to pull semi-trailers. However, others, such as GNSS unit 331 and lidar unit 338 (if used) are not currently standard equipment on such tractors or may not be present on a particular vehicle and may be installed as needed or desired to help support platooning.

FIG. 3 also illustrates various actuator controllers 350. It should be understood that, in various embodiments, some or all types of controllers may be referred to interchangeably as electronic control units (ECUs). ECUs will be described in further detail with regard to FIGS. 4 and 5. It should, however, be understood that some ECUs may control actuators, some ECUs may control communications, some ECUs may monitor sensors, and some may perform any combination thereof. Thus, it should be appreciated that the system shown in FIG. 3 is merely one of a wide variety of systems that may be used to control platooning.

Some of the vehicle actuator controllers 350 that platoon controller 310 may direct at least in part include engine torque controller 352; brake controller 354; transmission controller 356; steering/automated steering controller 357; and clutch controller 358. Of course, not all of these actuator controllers will be available or are required in any particular embodiment and it may be desirable to interface with a variety of other vehicle actuator controllers 359 that may be available on the vehicle as well. Therefore, it should be appreciated that the specific actuator controllers 350 directed or otherwise utilized by the platoon controller on any particular controlled vehicle may vary widely. Further, the capabilities of any particular actuator controller (e.g. engine torque controller 352), as well as its interface (e.g., the nature and format of the commands, instructions, requests and messages it can handle or generate) will often vary with the make and model of that particular actuator controller. Therefore, an actuator interface 360 is preferably provided to translate requests, commands, messages and instructions from the platoon controller 310 into formats that are appropriate for the specific actuator controller hardware and software utilized on the controlled vehicle. The actuator interface 360 also provides a mechanism for communicating/translating messages, commands, instructions and requests received from the various actuator controllers back to the platoon controller 310. In some embodiments, an appropriate actuator interface may be provided to interact with each of the specific vehicle controllers utilized. In various embodiments, this may include one or more of: an engine torque interface 361; a brake interface 362; a transmission interface 364; a retarder interface 365; a steering interface 367; and/or any other appropriate controller interface 369. In some embodiments, various controllers may be combined (e.g., in the case of a chasses controller, or an engine ECU that also controls a retarder—obviating the need for a retarder ECU).

Large trucks and other heavy vehicles frequently have multiple systems for "braking" the truck. These include the traditional brake system assemblies mounted in the wheels of the vehicle—which are often referred to in the industry as the "foundation brakes." Most large trucks/heavy vehicles also have a mechanism referred to as a "retarder" that is used to augment the foundation brakes and serve as an alternative mechanism for slowing the vehicle or to help prevent the vehicle from accelerating down a hill. Often, the retarder may be controlled by the engine torque controller 352 and in such embodiments, the retarder can be controlled by sending appropriate torque commands (which may be negative) to engine torque controller 352. In other embodiments a separate retarder controller (not shown) may be accessible to, and therefore directed by, platoon controller 310 through an appropriate retarder interface 365. In still other embodiments, the platoon controller 310 may separately determine a retarder command that it sends to the actuator interface 360. In such embodiments the actuator interface will interpret the retard command and pass on appropriate retardation control commands to an Engine ECU or other appropriate vehicle controller.

The communications between vehicles may be directed over any suitable channel and may be coordinated by inter-vehicle communications controller 370. As described above, the DSRC protocol may work well.

The specific information transmitted back and forth between the vehicles may vary widely based on the needs of the controllers. In various embodiments, the transmitted information may include the current commands generated by the platoon controller 310 such as requested/commanded engine torque, and/or requested/commanded braking deceleration 382. They may also include steering commands, gear commands, etc. when those aspects are controlled by platoon controller 310. Corresponding information is received from the partner vehicle, regardless of whether those commands are generated by a platoon controller or other suitable controller on the partner vehicle (e.g., an adaptive cruise control system (ACC) or a collision mitigation system (CMS)), or through other or more traditional mechanisms—as for example, in response to driver inputs (e.g., accelerator pedal position, brake position, steering wheel position, etc.).

In many embodiments, much or all of the tractor sensor information provided to platoon controller 310 is also transmitted to the platoon partner and corresponding information is received from the platoon partner so the platoon controllers 310 on each vehicle can develop an accurate model of what the partner vehicle is doing. The same is true for any other relevant information that is provided to platoon controller 310, including any vehicle configuration information 390 that is relevant to platoon controller 310. It should be appreciated that the specific information transmitted may vary widely based on the requirements of platoon controllers 310, the sensors and actuators available on the respective vehicles, and the specific knowledge that each vehicle may have about itself.

The information transmitted between vehicles may also include information/data about intended future actions as will be discussed in greater detail below. For example, if the lead vehicle knows it is approaching a hill, it may expect to increase its torque request (or decrease its torque request in the context of a downhill) in the near future and that information can be conveyed to a rear vehicle for use as appropriate by the platoon controller 310. Of course, there is a wide variety of other information that can be used to foresee future torque or braking requests and that information can be conveyed in a variety of different forms. In some embodiments, the nature of the expected events themselves can be indicated (e.g., a hill, curve, or exit is approaching) together with the expected timing of such events. In other embodiments, the intended future actions can be reported in the context of expected control commands such as the expected torques and/or other control parameters and the timing at which such changes are expected. Of course, there are a wide variety of different types of expected events that may be relevant to the platoon control.

The communications between the vehicles and the NOC may be transmitted over a variety of different networks, such as a cellular network, various Wi-Fi networks, satellite communications networks and/or any of a variety of other networks as appropriate. The communications with the NOC may be coordinated by NOC communications controller 380. The information transmitted to and/or received from the NOC may vary widely based on the overall system design. In some circumstances, the NOC may provide specific control parameters such as a target gap. These control parameters or constraints may be based on factors known at the NOC such as speed limits, the nature of the road/terrain (e.g., hilly vs. flat, winding vs. straight, etc.) weather conditions, traffic or road conditions, etc. In other circumstances the NOC may provide information such information to platoon controller 310. The NOC may also provide information about the partner vehicle including its configuration information and any known relevant information about its current operational state such as weight, trailer length, etc.

Lastly, with regard to FIG. 3, configuration file 390 may include a wide variety of information about the host vehicle that may be considered relevant to controller 310. By way of example, some of the information might include the vehicle's specification including such things as engine performance characteristics, available sensors, the existence and/or type of platooning indicators (e.g., lights that indicate a vehicle is platooning), the nature of its braking system, the location of its GNSS antenna relative to the front of the cab, gear ratios, differential ratios etc.

FIGS. 4-9 illustrate an example situations, as briefly described above, where a gap grows when two vehicles are platooning, commanding a maximum amount of torque, and reach a portion of road where a grade increases (e.g., a hill). In such a situation, torque may be limited and/or reduced. In various embodiments, limiting and/or reducing torque may instead be referred to as adjusting torque, commanding torque, or controlling torque (which is different than commanding, as described above). Moreover, rather than limiting and/or reducing torque, power, force, speed, and/or acceleration may be limited and/or reduced. In some embodiments, a reduction/limitation of torque may occur in response to a change in a gap distance, a rate of change of a gap, a communication from one vehicle to another (front to back or back to front) that a gap is growing and/or either vehicle's torque is maxed out (e.g., 100% of available toque is being requested/commanded), a map indicates a road grade is changing, and/or an inertial measurement unit (IMU) detects a change in a road grade. Further, in one or more embodiments, methods and systems described herein may not occur in response to attributes such as: the capabilities (e.g., an amount of torque) one or more of the vehicles may produce, a speed of one or more of the vehicles, a road type that one or more of the vehicles are traveling on, traffic conditions on a road that one or more of the vehicles are traveling on, or weather conditions affecting one or more of the vehicles. In some embodiments, based on these attributes being above and/or below a threshold amount, a length of time that a torque is reduced may be determined, an amount reduction in torque may be determined, a percentage of an amount of maximum torque to reduce by may be determined, etc. For example, an amount of reduction/limitation of torque (or speed, power, acceleration, etc.) may be based on an amount of time (e.g., a predicted amount of time it will take for the gap to return to a desired amount). Further, in one or more embodiments, a torque commanded by a front vehicle may be increased to maintain a gap. For example, vehicle's may be traveling downhill and torque may be increased to maintain a gap. In such a case, in some embodiments, an amount of engine break (retarder) may be limited.

As additional examples, limiting and/or reducing torque in a front vehicle may be caused by one or more of a front or read vehicle's: latitude, longitude, altitude, heading, speed, longitudinal and lateral acceleration, relative angle, type of load (e.g., type of materials a vehicle is carrying), position in a platoon, brake status, brake pressure, path history, path projection, travel plans, vehicle size, vehicle type, brake type, current operating mode (at least partially autonomous or manual), map data, traffic information, GPS augmentation information (e.g., delays from infrastructure), wheel speed, wheel torque, gross torque, net torque, amount of wind it is traveling in, amount of rain it is traveling in, amount of liquid on a road it is traveling on, infotainment system, suspension, axle weight(s), transmission status, battery, electronic throttle control, throttle pedal, brake pedal, power steering, adaptive cruise control, a blowout, retarder, anti-lock brakes, emergency braking, engine governor, powertrain, gear ratio, wheel size, wheel type, trailer length, trailer type, trailer height, amount of trailers, trailer position, current trailer position, past trailer position, tractor type, tractor height, transceiver type, current fuel, next planned stop, projected miles remaining until fuel tanks are empty, malfunctions, turn signals, LIDAR, radar, ultrasonic sensors, tire pressure, cabin temperature, engine temperature, trailer interior temperature, camera, etc.

Figure 4:
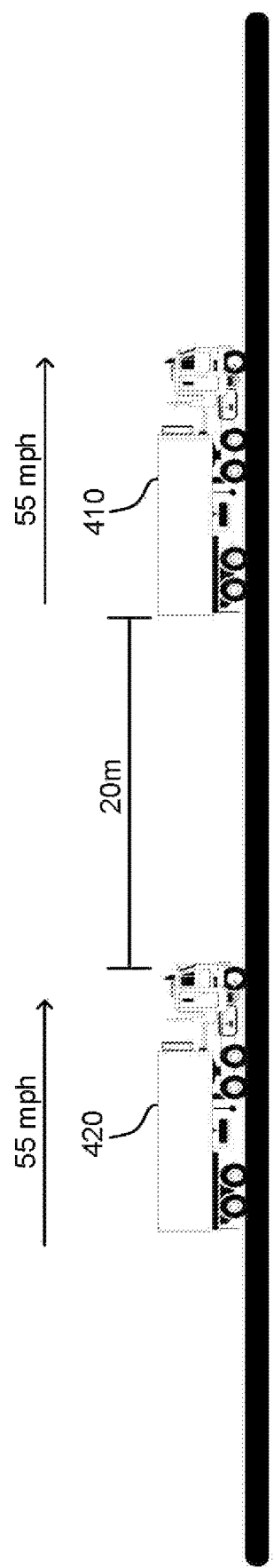
FIG. 4 illustrates an example of two platooning vehicles, in accordance with some embodiments.

FIG. 4 illustrates an example of two platooning vehicles, in accordance with some embodiments. In FIG. 4, front vehicle 410 is platooning with rear vehicle 420 on a flat road. As can be seen, front vehicle 410 is traveling at 55 miles per hour (mph), and rear vehicle 420 is traveling at 55 mph. Thus, the rate of change of the gap (which in this case is 20 meters) is 0 mph.

Figure 5:
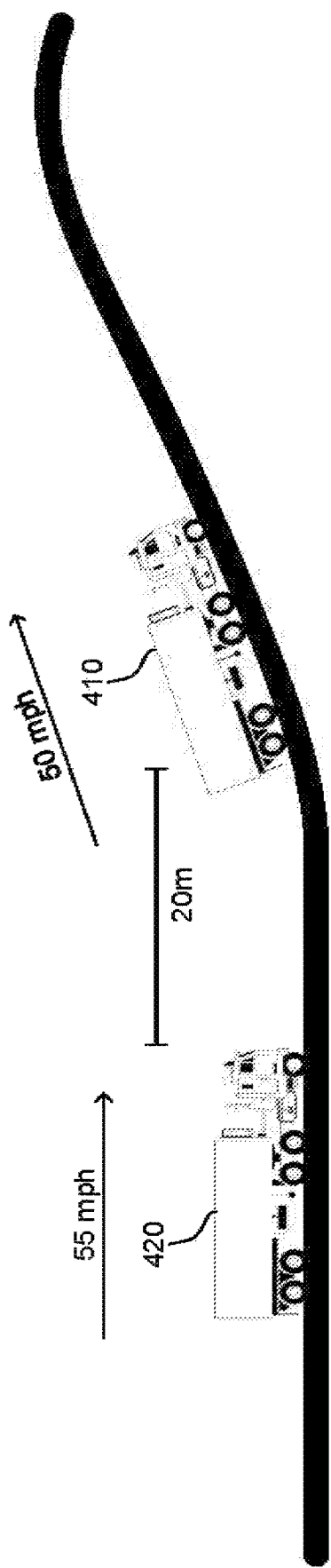
FIG. 5 illustrates an example of two platooning vehicles, in accordance with some embodiments.

FIG. 5 illustrates an example of two platooning vehicles, in accordance with some embodiments. In this FIG., front vehicle 410 reaches a hill. In systems and methods described herein, front vehicle 410 may be commanding 100% of its available torque, and thus cannot maintain its speed when it reaches the hill. As such, front vehicle 410 may slow to 50 mph as it begins to travel uphill. In this example, rear vehicle 420 is still traveling at 55 mph and commanding 100% of its available torque. It should be understood that the speeds of front vehicle 410 and rear vehicle 420 are examples only, and may be greater or smaller than illustrated. For example, front vehicle 410 may only slow by one or two mph, rather than 5.

Figure 6:
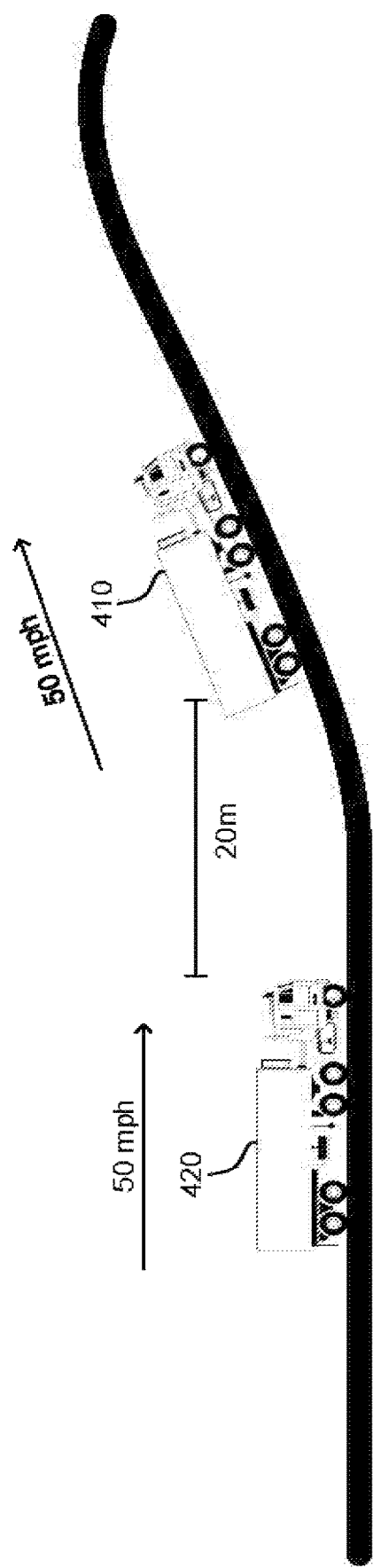
FIG. 6 illustrates an example of two platooning vehicles, in accordance with some embodiments.

FIG. 6 illustrates an example illustrates an example of two platooning vehicles, in accordance with some embodiments. In this FIG., in response to front vehicle 410 slowing, rear vehicle 420 slows to maintain a desired gap. In this example, because the speed of front vehicle 410 was reduced to 50 mph, rear vehicle 420 also slows to 50 mph, and the gap between front vehicle 410 and rear vehicle 420 remains at 20 meters.

Figure 7:
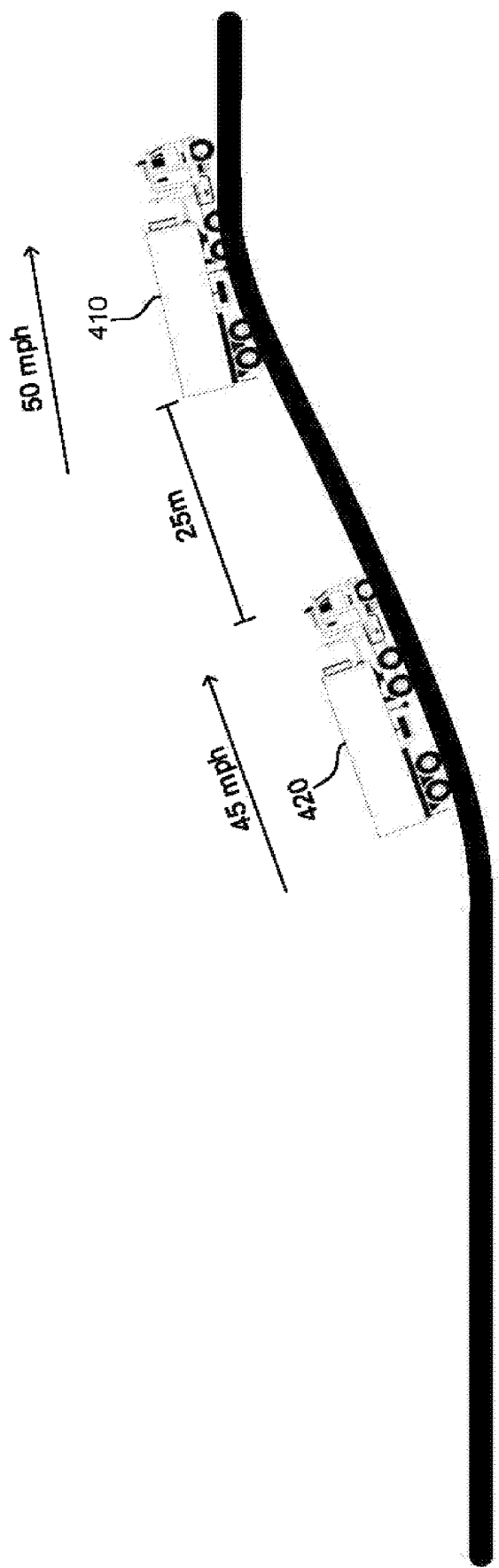
FIG. 7 illustrates an example of two platooning vehicles, in accordance with some embodiments.

FIG. 7 illustrates an example of two platooning vehicles, in accordance with some embodiments. In this example, because rear vehicle 420 has slowed to 50 mph, when it reaches the hill it does not have the same momentum front vehicle 410 had when it reached the hill at 55 mph. Thus, its speed is reduced to 45 mph, while front vehicle 410 continues to travel at 50 mph. This discrepancy in speeds between the vehicles causes the gap to increase to 25 meters, in this example.

In some embodiments, rear vehicle 420 may change gears to reduce a gap. However, in some embodiments it may be preferable to have front vehicle 410 slow down to reduce a gap.

Figure 8:
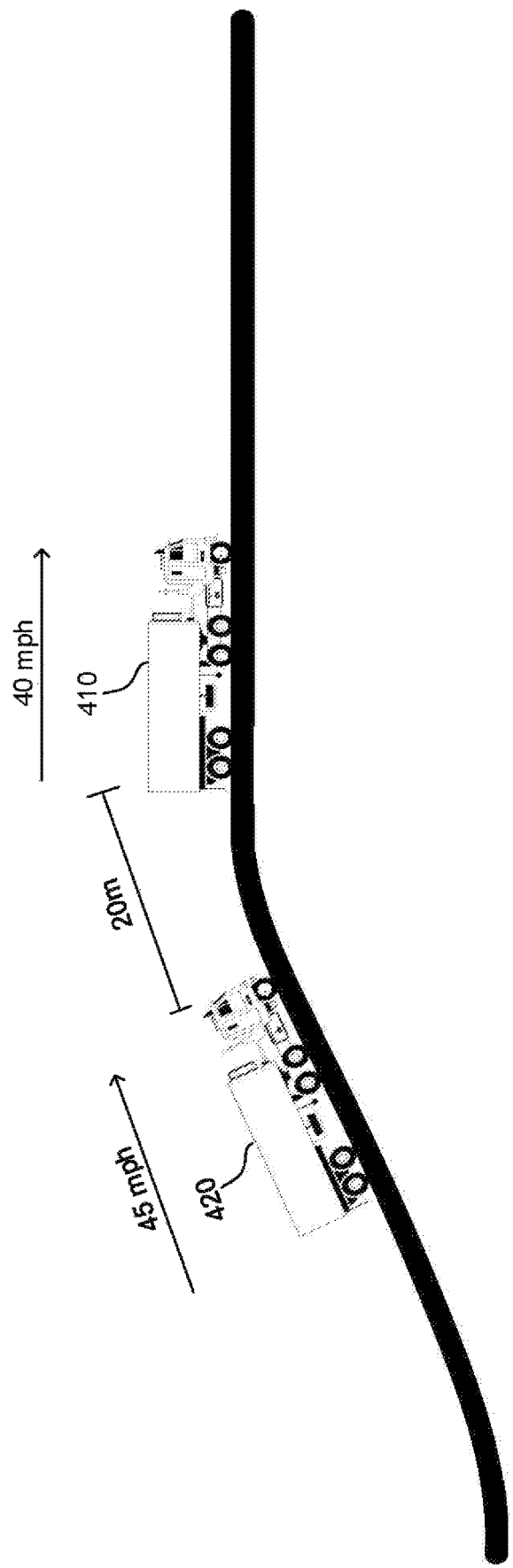
FIG. 8 illustrates an example of two platooning vehicles, in accordance with some embodiments.

FIG. 8 illustrates an example of two platooning vehicles, in accordance with some embodiments. Here, the torque (or speed, acceleration, power, etc.) of front vehicle 410 is reduced and/or limited to allow the gap to decrease. As can be seen in example FIG. 8, front vehicle 410 has reduced its speed to 40 mph, while the speed of rear vehicle 420 remains at 45 mph. Thus, the gap returns to its desired amount. As described elsewhere herein, it should be understood that either vehicle may command and/or control the speed and/or torque of the other vehicle via a wireless connection (also referred to as a wireless link).

Figure 9:
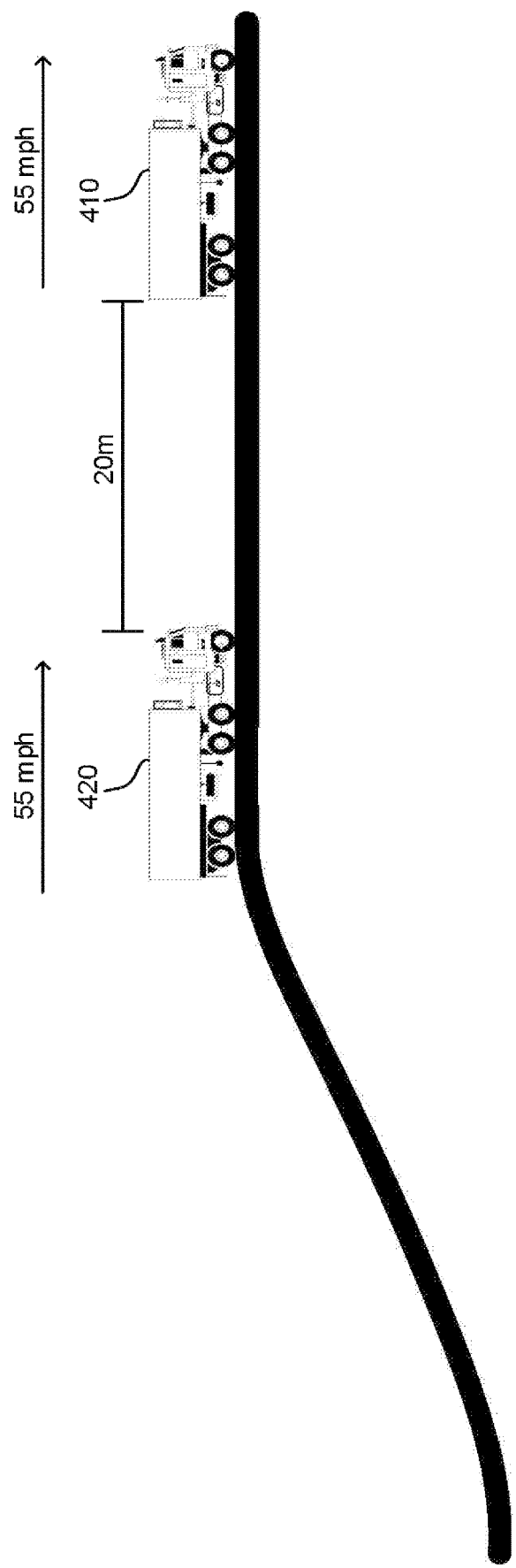
FIG. 9 illustrates an example of two platooning vehicles, in accordance with some embodiments.

FIG. 9 illustrates an example of two platooning vehicles, in accordance with some embodiments. Here, since the gap was reduced and its desired amount was achieved (in FIG. 8), the front vehicle 410 is able to once again travel at a faster speed, rear vehicle 420 also travels at that speed (55 mph in this example), and the gap is maintained at its desired amount—as in FIG. 4 where front vehicle 410 and rear vehicle 420 were traveling on a flat road before they reached the hill.

Figure 10:
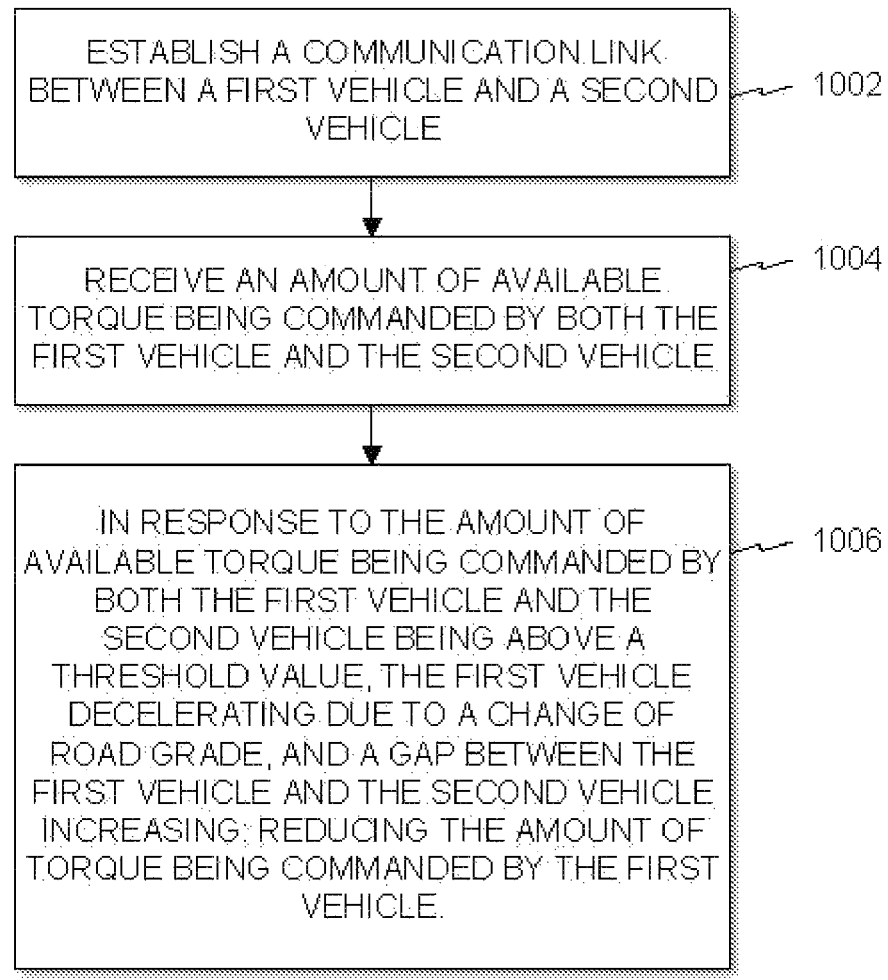
FIG. 10 illustrates a flow chart of an example process, in accordance with some embodiments.

FIG. 10 illustrates a flow chart of an example process, in accordance with some embodiments. While the various steps in the flowchart is presented and described sequentially, one of ordinary skill will appreciate that some or all of the steps can be executed in different orders and some or all of the steps can be executed in parallel. Further, in one or more embodiments of the invention, one or more of the steps can be omitted, repeated, and/or performed in a different order. Accordingly, the specific arrangement of steps shown in FIG. 10 should not be construed as limiting the scope of the invention. In one or more embodiments, the steps of FIG. 10 can be performed by example systems 100, 200, 300, and/or 1000.

At step 1002, a communication link is established between a first vehicle and a second vehicle (which may include communication via infrastructure, a base station, the cloud, etc.). This communication link may be established at any point in time (e.g., before vehicles start platooning, before vehicles are even within eyesight of each other). This link may allow vehicles to transfer information such as a number of RPMs an engine is spinning at, an amount of torque being produced by one or more vehicles, the size of a gap between the first vehicle and the second vehicle, information from sensors located on the first vehicle and/or the second vehicle, information from a platooning electronic control unit, a gear ratio a vehicle is in, a gear ratio a vehicle is changing to, a gear ratio a vehicle was at before changing gears, etc. Additional vehicle attributes discussed above may also be transmitted between two or more vehicles.

At step 1004, an amount of torque (e.g., available torque, which may be engine torque or another type of torque) being commanded (or controlled) by both the first vehicle and the second vehicle is received. This information may be received at the first vehicle and/or the second vehicle. The first vehicle and/or the second vehicle may be controlling one another. In some embodiments, more than two vehicles may be included in the platoon. In one or more of the embodiments, the vehicles may not be platooning at all.

At step 1006, the amount of torque being commanded (or controlled) by a front vehicle (which may be the first vehicle or the second vehicle), is reduced. This may be caused by one or more of: an amount of torque being commanded (or controlled) by the front and/or rear vehicle being above and/or below a threshold amount; the front vehicle decelerating due to a change of road grade (e.g., when the front vehicle begins traveling over a hill); and a gap between the first vehicle and the second vehicle increasing (e.g., beyond a threshold value). Such a threshold value may be a desired gap amount, an amount within two bounds of a desired gap, etc. In some embodiments the torque being commanded by the front vehicle may be limited instead of, or in addition to being reduced. In some embodiments, a cruise control system may be used, at least in part, to reduce an amount of torque being commanded by the front vehicle. In some embodiments, the amount of being commanded by the front vehicle may be reduced in response to a signal received by the rear vehicle. In some embodiments, such a signal may be sent to a front vehicle in response to the rear vehicle sensing that the front vehicle is decelerating and/or a change (increase and/or decrease) in a road grade (e.g., a road grade that at least the rear vehicle is about to travel over).

As described above, in some embodiments a front vehicle's torque may be limited to reduce a gap with or without an increase in road grade. For example, if a rear vehicle cannot travel faster than it currently is (e.g., due to an aspect of its system or a speed limit), then a front vehicle may need to have its torque limited/reduced to shrink the gap. In some embodiments, a speed limit may be provided to one or more of a front and rear vehicle via a NOC or other remote device. In some embodiments, a speed limit may be sensed by a vehicle (e.g., via camera) or entered by a user (e.g., a driver or a user of a remote terminal). In response to the determination of a speed limit, or another reason a rear vehicle cannot speed up (and/or one or more of the vehicles commanding a threshold amount of torque), the front vehicle's torque may be reduced such that the gap shrinks. Once at, or substantially at (e.g., within 1, 2, 3, 4, or 5 meters) a desired gap, a front vehicle's torque may increase (e.g., the front vehicle may return to its speed prior to the torque/speed limiting). In some embodiments, a front vehicle's torque may stop being limited/increase such that both vehicles are traveling at a speed limit at the time the desired gap is achieved.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

This disclosure contains numerous references to a NOC and to one or more processors. According to various aspects, each of these items may include various kinds of memory, including non-volatile memory, to store one or more programs containing instructions for performing various aspects disclosed herein.

Figure 11:
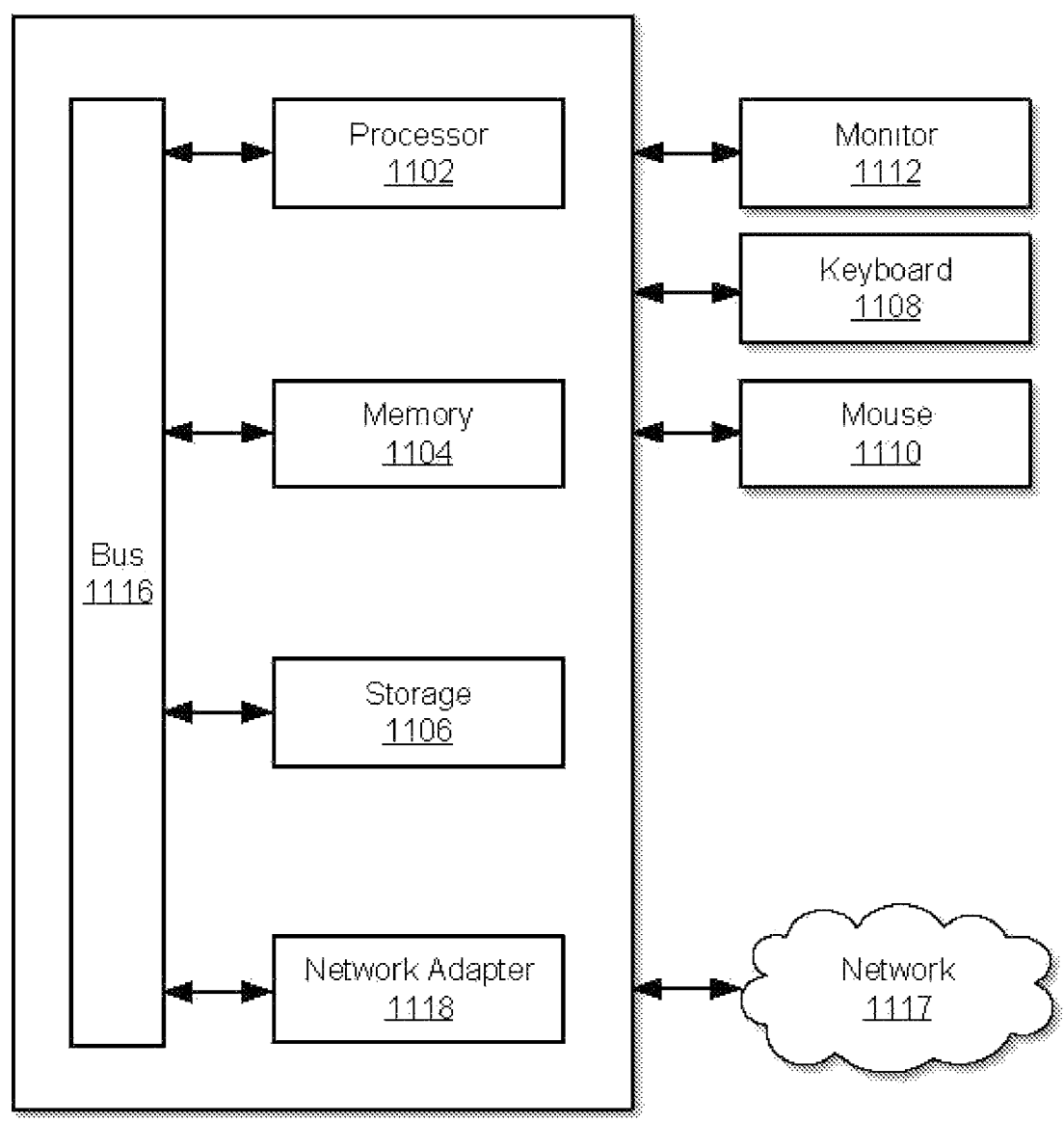
FIG. 11 illustrates an example computer system, in accordance with some embodiments.

For example, as shown in FIG. 11, example computing system 1100 may include one or more computer processor(s) 1102, associated memory 1104 (e.g., random access memory (RAM), cache memory, flash memory, read only memory (ROM), electrically erasable programmable ROM (EEPROM), or any other medium that can be used to store the desired information and that can be accessed to retrieve that information, etc.), one or more storage device(s) 1106 (e.g., a hard disk, a magnetic storage medium, an optical drive such as a compact disk (CD) drive or digital versatile disk (DVD) drive, a flash memory stick, etc.), and numerous other elements and functionalities. The computer processor(s) 1102 may be an integrated circuit for processing instructions. For example, the computer processor(s) may be one or more cores or micro-cores of a processor. The computing system 1100 may also include one or more input device(s) 1110, such as a touchscreen, keyboard, mouse, microphone, touchpad, electronic pen, or any other type of input device. Further, the computing system 1100 may include one or more output device(s) 1108, such as a screen (e.g., a liquid crystal display (LCD), a plasma display, touchscreen, cathode ray tube (CRT) monitor, projector, or other display device), a printer, external storage, or any other output device. The computing system 1100 may be connected to a network 1114 (e.g., a local area network (LAN), a wide area network (WAN) such as the Internet, mobile network, or any other type of network) via a network interface connection 1118. The input and output device(s) may be locally or remotely connected (e.g., via the network 1112) to the computer processor(s) 1102, memory 1104, and storage device(s) 1106.

One or more elements of the aforementioned computing system 1100 may be located at a remote location and connected to the other elements over a network 1114. Further, embodiments of the invention may be implemented on a distributed system having a plurality of nodes, where each portion of the invention may be located on a subset of nodes within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

For example, one or more of the software modules disclosed herein may be implemented in a cloud computing environment. Cloud computing environments may provide various services and applications via the Internet (e.g., the NOC). These cloud-based services (e.g., software as a service, platform as a service, infrastructure as a service, etc.) may be accessible through a Web browser or other remote interface.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment.

While this disclosure has been described in terms of several aspects, there are alterations, modifications, permutations, and equivalents which fall within the scope of this disclosure. In view of the many alternative ways of implementing the methods and apparatuses of the present disclosure, it is intended that the following appended claims be interpreted to include all such alterations, modifications, permutations, and substitute equivalents as falling within the true scope of the present disclosure.

What is claimed is:

1. A method for determining an amount of torque at a power plant of a platooning vehicle, comprising:
   establishing a communication link between a first vehicle and a second vehicle, wherein the first vehicle and the second vehicle are platooning;
   receiving, at an electronic control unit in one of the first vehicle and the second vehicle, an amount of available torque being commanded by both the first vehicle and the second vehicle; and
   in response to the amount of the available torque being commanded by both the first vehicle and the second vehicle being above a threshold value, the first vehicle decelerating due to a change of road grade, and a gap between the first vehicle and the second vehicle increasing:
      reducing the amount of torque being commanded by the first vehicle.

2. The method of claim 1, wherein the amount of available torque being commanded by the first vehicle is transmitted to the second vehicle via the communication link.

3. The method of claim 2, wherein the electronic control unit is in the second vehicle.

4. The method of claim 1, wherein the electronic control unit is a platooning electronic control unit.

5. The method of claim 1, wherein the amount of the available torque being commanded by both the first vehicle and the second vehicle is above 95%.

6. The method of claim 1, wherein the gap between the first vehicle and the second vehicle increases at least in part in response to the second vehicle determining that first vehicle is decelerating.

7. The method of claim 1, wherein the gap between the first vehicle and the second vehicle increases at least in part in response to the first vehicle determining that it is decelerating.

8. The method of claim 1, wherein reducing the amount of torque being commanded by the first vehicle is performed by a cruise control system.

9. The method of claim 1, further comprising:
   increasing the amount of torque being commanded by the first vehicle in response to the gap returning to a desired amount.

10. A method for causing vehicles to travel with a desired gap between them, comprising:
    receiving, at a first vehicle via a wireless connection from a second vehicle, an amount of torque being commanded by the second vehicle;
    in response to:
       (1) the amount of torque of the first vehicle and the second vehicle being above a threshold amount; and
       (2) a gap between the vehicles increasing;
    causing the second vehicle to reduce its speed such that the desired gap is achieved.

11. The method of claim 10, wherein the gap between the vehicles is the desired gap prior to the gap between the vehicles increasing.

12. The method of claim 10, wherein the second vehicle reduces its speed by reducing an amount of torque produced by its engine.

13. The method of claim 10, wherein the amount of torque is an available amount of torque, and wherein the threshold amount is a threshold available amount.

14. The method of claim 10, wherein the gap between the first vehicle and the second vehicle is determined by a sensor on the first vehicle.

15. The method of claim 10, wherein the gap between the first vehicle and the second vehicle is determined by a sensor on the second vehicle.

16. A method for determining a desired amount of torque in a lead vehicle based at least in part on information about the follow vehicle, comprising:
    determining an amount of gap between the lead vehicle and the follow vehicle;
    determining whether the amount of gap is a desired amount;
    in response to the amount of gap being above the desired amount, determining the desired amount of torque in the lead vehicle to cause the amount of gap between the lead vehicle and the follow vehicle to reach the desired amount; and
    reduce an amount of torque in the lead vehicle to the determined desired amount of torque.

17. The method of claim 16, wherein the desired amount of torque in the lead vehicle is further determined based on an amount of torque being commanded by the lead vehicle and the follow vehicle.

18. The method of claim 16, further comprising:
    determining a speed limit, wherein the desired amount of torque in the lead vehicle is further determined based on the determined speed limit.

19. The method of claim 16, further comprising:
    increasing the amount of torque in the lead vehicle in response to the amount of gap substantially reaching the desired amount.

20. The system of claim 16, further comprising:
    in response to reducing the amount of torque in the lead vehicle, disabling a driver's ability to control the amount of torque in the lead vehicle.

* * * * *